United States Patent [19]

Greminger, Jr. et al.

[11] 3,839,319

[45] Oct. 1, 1974

[54] HYDROXYPROPYL METHYLCELLULOSE ETHERS AND METHOD OF PREPARATION

[75] Inventors: George K. Greminger, Jr., Midland, Mich.; Carl P. Strange, Walker, La.; Karl L. Krumel, Tulsa, Okla.; James L. Hudson, Jr., Brandon, Fla.

[73] Assignee: The Dow Chemical Company, Midland, Mich.

[22] Filed: Jan. 26, 1973

[21] Appl. No.: 327,013

[52] U.S. Cl.............. 260/231, 106/170, 106/189, 106/197 R, 424/362
[51] Int. Cl............................................ C08b 11/00
[58] Field of Search................ 260/231 CM, 231 R; 106/170, 189, 197 C

[56] References Cited
UNITED STATES PATENTS

| | | | |
|---|---|---|---|
| 2,958,607 | 11/1960 | Windover et al. | 106/197 C |
| 3,388,082 | 6/1968 | Rodgers et al. | 260/17 R |
| 3,493,407 | 2/1970 | Greminger et al. | 106/189 |
| 3,712,886 | 1/1973 | Koyanagi et al. | 260/226 |

Primary Examiner—Donald E. Czaja
Assistant Examiner—Ronald W. Griffin
Attorney, Agent, or Firm—Richard W. Hummer

[57] ABSTRACT

Novel hydroxypropyl methylcellulose ethers have a methoxyl degree of substitution of from 0.2 to 1.0 and a hydroxypropyl molar substitution of at least about 1.5 with a total combined degree of substitution of at least about 1.8. These ethers have desirable solubility properties in anhydrous organic solvents such as methanol and ethanol and can be employed as thickeners and film formers. They are prepared by concurrent reaction of controlled proportions of methyl chloride and propylene oxide with alkali cellulose.

4 Claims, No Drawings

HYDROXYPROPYL METHYLCELLULOSE ETHERS AND METHOD OF PREPARATION

BACKGROUND OF THE INVENTION

In U.S. Pat. No. 3,388,082 there is provided a class of hydroxypropyl methylcellulose ethers having a variety of desirable properties, particularly as thickeners providing good color development and leveling in water-based paints and coatings. For certain uses, however, commercially available cellulose ethers of the aforesaid class lack necessary properties. For example, it is desirable to have available water-soluble coatings for pharmaceuticals which can be applied to water-sensitive drugs from an anhydrous alcoholic solution. Prior, commercially available hydroxypropyl methylcellulose ethers have required the use of a chlorinated solvent such as methylene chloride or chloroform in combination with an aliphatic alcohol to prepare anhydrous solutions thereof. Such solutions containing chlorinated solvents are undesirable from the standpoint of possible contamination of the environment or of toxic residues which may be difficult to remove from pharmaceutical products prepared therewith.

SUMMARY OF THE INVENTION

In accordance with the present invention, it has been discovered that a class of hydroxypropyl methylcellulose ethers having a relatively high degree of hydroxypropyl substitiution have desirable properties particularly as regards solubility in anhydrous methanol and ethanol to provide highly viscous anhydrous alcoholic solutions. The novel cellulose ethers of the invention are thermoplastic and water-soluble and are characterized by a methoxyl degree of substitution (D.S.) of from about 0.2 to about 1.0 and a hydroxypropyl molar substitution (M.S.) of at least about 1.5. The preferred cellulose ethers of the invention have a methoxyl degree of substitution of from 0.4 to 0.8 and a hydroxypropyl molar substitution of from about 1.5 to about 1.8. In any case, the combined degree of methoxyl substitution and of hydroxypropyl molar substitution should provide a total degree of substitution of at least about 1.8. A further embodiment of the invention comprises a novel method for preparing the new cellulose ethers.

The unusual properties of the novel cellulose ethers of the invention make them useful for numerous purposes, for example, in the thickening of paint removers containing methanol and methylene chloride or of solutions such as mixed alkanols or mixtures of toluene and methanol. These new cellulose ethers may be employed in anhydrous alcoholic solution for the coating of tablets or for casting of various types of water-soluble films.

In the preparation of the cellulose ethers, alkali cellulose is prepared in conventional fashion, for example, in accordance with the general procedures of U.S. Pat. No. 3,388,082. The alkali cellulose is then reacted with a mixture of propylene oxide and methyl chloride to produce the desired cellulose ether products which are recovered by washing with hot water and drying. When the alkali cellulose is prepared employing sodium hydroxide, the ratio of caustic to cellulose should be maintained at a relatively low value of from about 0.25 to about 0.45, preferably 0.35 to 0.4, part by weight of sodium hydroxide per part of cellulose. If other alkalies are employed, they are used in amounts which are molar equivalents of the amounts specified for sodium hydroxide. The resulting alkali cellulose is reacted with a mixture containing from about 1.5 4 parts of propylene oxide and from 0.4 to about 0.8 part of methyl chloride per part by weight of cellulose, provided, however, that such weights are adjusted to provide at least 2 moles of propylene oxide per mole of methyl chloride in the reaction mixture. In large scale operation, it is preferred to employ the least proportion of propylene oxide required to obtain the desired degree of molar substitution of hydroxypropyl groups. Good results have been obtained when employing about 0.35-0.4 part of sodium hydroxide, 1.5-2 parts of propylene oxide and 0.6-0.8 part of methyl chloride per part by weight of cellulose.

In carrying out the reaction, cotton linters or finely ground wood cellulose are thoroughly mixed with an aqueous 50 percent sodium hydroxide solution in an amount sufficient to provide the desired ratio of sodium hydroxide to cellulose and the resulting alkali cellulose product is cooled and maintained under vacuum or an atmosphere of nitrogen. The required amount of propylene oxide together with all or part of the methyl chloride is added and the resulting reaction mixture is maintained with thorough agitation at temperatures of from about 50°C. to about 75°C. for a period of several hours to complete the etherification reaction. It is critical for obtaining the desired type of cellulose ethers that the initial charge of etherifying agents contain at least about 60 percent of the methyl chloride to be employed. If desired, the entire charge of methyl chloride can be introduced at the time of introducing the propylene oxide. Alternatively, a major portion of the methyl chloride is introduced along with the propylene oxide at the initiation of the reaction and the remainder of the methyl chloride is introduced after the initial reaction of propylene oxide is substantially complete. The reaction between the alkali cellulose and propylene oxide is strongly exothermic so that it is essential to control the rate of heating of the reaction mass in the initial stages of the etherification reaction. On completion of the reaction, the reaction vessel is vented and the product is washed with hot water until substantially free of salt and unreacted starting materials. The product then is dried in conventional fashion and may be ground to a fine particle size as desired. It is among the advantages of the invention that the novel hydroxypropyl methylcellulose ether products have relatively low gelling temperature in the range of 40° to 50°C. which facilitates the washing operation. Such products can be ground to form free-flowing powders which pass a screen having 60 meshes or more to the inch and in such form have been found to dissolve rapidly in methanol to produce clear homogeneous solutions containing one percent or more of the ether.

The following examples illustrate the invention but are not to be construed as limiting.

Example 1

20 pounds of ground cotton linters were added to an internally agitated vessel designed for operation under vacuum or pressure. Air was evacuated from the vessel and 14 pounds of aqueous 50 percent sodium hydroxide solution was sprayed onto and thoroughly mixed with the linters. Thereafter 80 pounds of propylene oxide and 16 pounds of methyl choride were added to the vessel with vigorous agitation and the reaction mixture heated gradually over a period of 90 minutes from ambient conditions to a temperature of 60°C. and maintained at 60°C. under autogenous pressure for a further period of about 5.5 hours to complete the reaction. Heating was then discontinued and the vessel was vented and the product recovered by washing with hot water and drying. The resulting white solid product was soluble in anhydrous methanol and in water, having a gel point of about 43°C. in the latter, and was found by analysis to contain 7.0 percent by weight of methoxyl substitution and 45.0 percent by weight of hydroxypropoxyl substitution, corresponding to a methoxyl D.S. of 0.58 and a hydroxypropyl M.S. of 1.58, respectively. 1 gram of this hydroxypropyl methylcellulose product dissolved readily in 100 grams of anhydrous methanol to produce a clear, viscous solution having a viscosity of 700 centipoises as determined with an Ubbelohde viscosimeter at 20°C. The methanolic solution was suitable for casting thin water-soluble films and for applying transparent, water-soluble film coatings to tabletted pharmaceutical compositions.

Example 2

The process of Example 1 was repeated except that the reaction mixture was heated gradually over a period of 90 minutes from ambient conditions to a temperature of 70°C. and maintained at 70°C. for a period of 3.5 hours. The recovered product had excellent solubility in water and in anhydrous methanol and was found by analysis to contain 10.7 percent by weight of methoxyl substitution and 44.9 percent by weight of hydroxypropoxyl substitution corresponding to a methoxyl D.S. of about 0.93 and a hydroxypropyl M.S. of about 1.62.

Example 3

The general procedure of Example 1 was followed except that the 20 pounds of ground cotton linters was reacted with 10 pounds of aqueous 50 percent sodium hydroxide solution and the resulting alkali cellulose treated with 80 pounds of propylene oxide and 8 pounds of methyl chloride. The resulting washed and dried product was a white solid, soluble in cold water and in absolute methanol. It was found by analysis to contain 1.9 percent by weight of methoxyl substitution and 56.7 percent by weight of hydroxypropoxyl substitution corresponding to a methoxyl D.S. of about 0.2 and a hydroxypropyl M.S. of about 2.2.

Example 4

2,500 Pounds of cotton linters was placed in a reactor which was sealed and evacuated. 2,000 Pounds of aqueous 50 percent by weight sodium hydroxide solution was then sprayed onto and thoroughly mixed with the linters. After completion of the addition of the alkali, 6,300 pounds of propylene oxide and 1,000 pounds of methyl chloride were added to the reactor at ambient temperature and the resulting mixture was agitated and heated gradually over a period of 1.5 hours to a temperature of 50°C. and then maintained at 50°C. for 2 additional hours. 500 Additional pounds of methyl chloride was then added to the reaction mixture and the reactor and contents were heated at temperatures of 65°-70°C. for one hour after which the reactor was vented and the product recovered and purified by washing and drying. The resulting white granular product was found by analysis to contain 8.9 percent by weight of methoxyl substitution and 43.7 percent by weight of hydroxypropoxyl substitution corresponding, respectively, to a methoxyl D.S. of 0.74 and a hydroxypropyl M.S. of 1.52. A portion of the product was ground to pass a screen having 100 meshes to the inch and the resulting finely divided product was added with stirring to absolute methanol to provide 1 percent by weight of the product in the methanol. This product was totally dissolved to produce a clear homogeneous methanolic solution in 30 minutes. The 1 percent solution of the product in methanol was found to have a viscosity of 450 centipoises as determined with an Ubbelohde viscosimeter at 20°C.

In the preferred method of preparing the novel hydroxypropyl methylcellulose ethers, the proportion of methyl chloride is adjusted to provide at least one mole of methyl chloride in the overall reaction for each mole of alkali metal hydroxide incorporated in the alkali cellulose. Such adjustment of proportions of methyl chloride and alkali cellulose must be carried out while maintaining the critical proportions of total reactants as set forth hereinabove.

What is claimed is:

1. A process for preparing hydroxypropyl methylcellulose ether, soluble in cold water and in anhydrous methanol, which comprises the steps of preparing alkali cellulose by reacting cellulose with a concentrated sodium hydroxide solution in amount to provide from about 0.25 to about 0.45 part by weight of sodium hydroxide per part by weight of cellulose, and reacting said alkali cellulose with a mixture containing from about 1.5 to 4 parts of propylene oxide and from 0.4 to about 0.8 part of methyl chloride per part by weight of cellulose in the alkali cellulose, the amounts of propylene oxide and methyl chloride employed in the total reaction being adjusted to provide at least 1 mole of methyl chloride for each mole of sodium hydroxide incorporated in the alkali cellulose and at least 2 moles of propylene oxide per mole of methyl chloride employed.

2. A process according to claim 1 wherein 0.35 to 0.4 part of sodium hydroxide, 1.5 to 2 parts of propylene oxide and 0.6 to 0.8 part of methyl chloride are employed per part by weight of cellulose in the reaction mixture.

3. A process according to claim 1 wherein the alkali cellulose and the mixture of propylene oxide and methyl chloride are combined at ambient temperature and heated with thorough agitation to a temperature of from about 50°C. to about 75°C. for a period of time to complete the etherification reaction.

4. A process according to claim 3 wherein a major proportion of the methyl chloride is introduced along with the propylene oxide at the initiation of the reaction and the remainder of the methyl chloride is introduced after the initial reaction of propylene oxide is substantially completed.

\* \* \* \* \*